US006784401B2

(12) United States Patent
North et al.

(10) Patent No.: US 6,784,401 B2
(45) Date of Patent: Aug. 31, 2004

(54) WELDING ELECTRODE AND METHOD FOR REDUCING MANGANESE IN FUME

(75) Inventors: Thomas H. North, Burlington (CA); Lowell E. Mott, Troy, OH (US)

(73) Assignees: Illinois Tool Works Inc., Glenview, IL (US); University of Toronto (CA)

( * ) Notice: Subject to any disclaimer, the term of this patent is extended or adjusted under 35 U.S.C. 154(b) by 0 days.

(21) Appl. No.: 09/772,708

(22) Filed: Jan. 30, 2001

(65) Prior Publication Data

US 2002/0153364 A1 Oct. 24, 2002

(51) Int. Cl.⁷ ................................................ B23K 9/00
(52) U.S. Cl. .............. 219/137; 219/146.31; 219/146.52
(58) Field of Search ......................... 219/137, 146.361, 219/146.52, 136, 145.1, 146.1, 146.3

(56) References Cited

U.S. PATENT DOCUMENTS

| | | | | |
|---|---|---|---|---|
| 3,645,782 A | * | 2/1972 | Johnson | 117/205 |
| 3,702,390 A | * | 11/1972 | Blanke et al. | 219/146 |
| 3,935,414 A | * | 1/1976 | Ballass et al. | 219/61 |
| 4,010,309 A | * | 3/1977 | Petersen | 428/386 |
| 4,122,238 A | | 10/1978 | Frantzerb, Sr. | |
| 4,282,420 A | * | 8/1981 | Banks | 219/146.24 |
| 5,368,223 A | | 11/1994 | Chevrel et al. | 228/214 |
| 5,369,244 A | * | 11/1994 | Kulikowski et al. | 219/145.22 |

FOREIGN PATENT DOCUMENTS

| | | |
|---|---|---|
| EP | 0067494 | 12/1982 |
| EP | 0600293 | 6/1994 |
| GB | 1056804 | 2/1967 |
| WO | WO 89/07036 | 8/1989 |

* cited by examiner

Primary Examiner—M. Alexandra Elve
(74) Attorney, Agent, or Firm—Thompson Hine LLP

(57) ABSTRACT

A cored electrode for arc welding wherein the electrode has a core in which the fill material includes a manganese-containing composite particle. A method for arc welding comprises providing a cored electrode having a core of fill material including a composite particle containing manganese, and applying a voltage to the electrode upon contacting a work piece to cause the electrode to melt and form a weld metal bead.

10 Claims, 2 Drawing Sheets

WELDING ELECTRODE AND METHOD FOR REDUCING MANGANESE IN FUME

BACKGROUND

The invention relates generally to weld wires or electrodes useful in joint and surface welding and more specifically to flux cored weld wires.

Flux cored weld wires are commonly employed in electric arc welding of mild and low alloy steel base metals. Flux cored wires are used increasingly as an alternative to solid weld wires for improved productivity in structural fabrication. These wires yield high strength welds in single pass and multiple pass welding operations at high welding speed. Flux core weld wires are composite tubular filler metal electrodes having a metal sheath and a core containing a composition of various powdered materials. The core composition comprises approximately 1 to 45% of the total wire weight. During the manufacture of the wire, the core composition is blended and deposited onto a steel strip, which is formed into a tube or sheath about the core composition in a forming mill. The steel sheath surrounding the core composition is then drawn or rolled through reducing dies to a specified diameter.

Manganese is an essential alloying addition in most welding electrodes. Manganese has several functions. It is a key strengthening alloy to the weld deposit; it chemically reacts with sulphur components in the molten weld metal, it acts as a de-oxidizer, and it affects weld puddle control, wetting action and general ease of use of the welding electrode itself. The current levels of manganese used in conventional electrodes reflect the optimum combination of alloying elements with iron to produce grades of welds that meet standard levels for strength and ductility.

Recently, the amount of manganese present in the fume generated when welding with electrodes containing manganese has been scrutinized for possible health or safety related issues. Governmental authorities have considered regulations to limit the amount of manganese. However, it is not feasible to eliminate manganese in conventional welds without negatively affecting the mechanical properties of the weld. The use of other alloying elements has been considered in an effort to lower total manganese levels while maintaining sufficient mechanical property levels in the weld without success. To date it has not been possible to significantly reduce the use of manganese in conventional weld wires and electrodes.

SUMMARY OF THE INVENTION

It has been found that the amount of manganese that is present in the fume that is generated during arc welding can be reduced significantly if the manganese is incorporated into the electrode as a composite particle that contains a shielding material. As the electrode melts during the welding operation, the shielding material is believed to prevent the manganese from oxidizing. As a result, more manganese resides in the weld deposit and less is present in the fume. The preferred shielding material is $TiO_2$ and more particularly rutile $TiO_2$.

Accordingly, one manifestation of the invention is a flux cored welding electrode in which manganese is incorporated entirely or partially into the electrode fill as a composite particle of manganese and shielding material.

Another manifestation of the invention is a process for arc welding using the aforementioned electrode. This process is advantageous because the fume contains significantly reduced levels of manganese.

Another manifestation of the invention is a process for arc welding on low carbon steel substrate using an electrode including a core fill containing manganese wherein the fume contains less than 7% by weight of manganese.

Another manifestation of the invention is a composite particle of manganese and shielding material that is useful in the electrode fill of a flux core welding electrode.

DETAILED DESCRIPTION OF THE INVENTION

Figure 1:
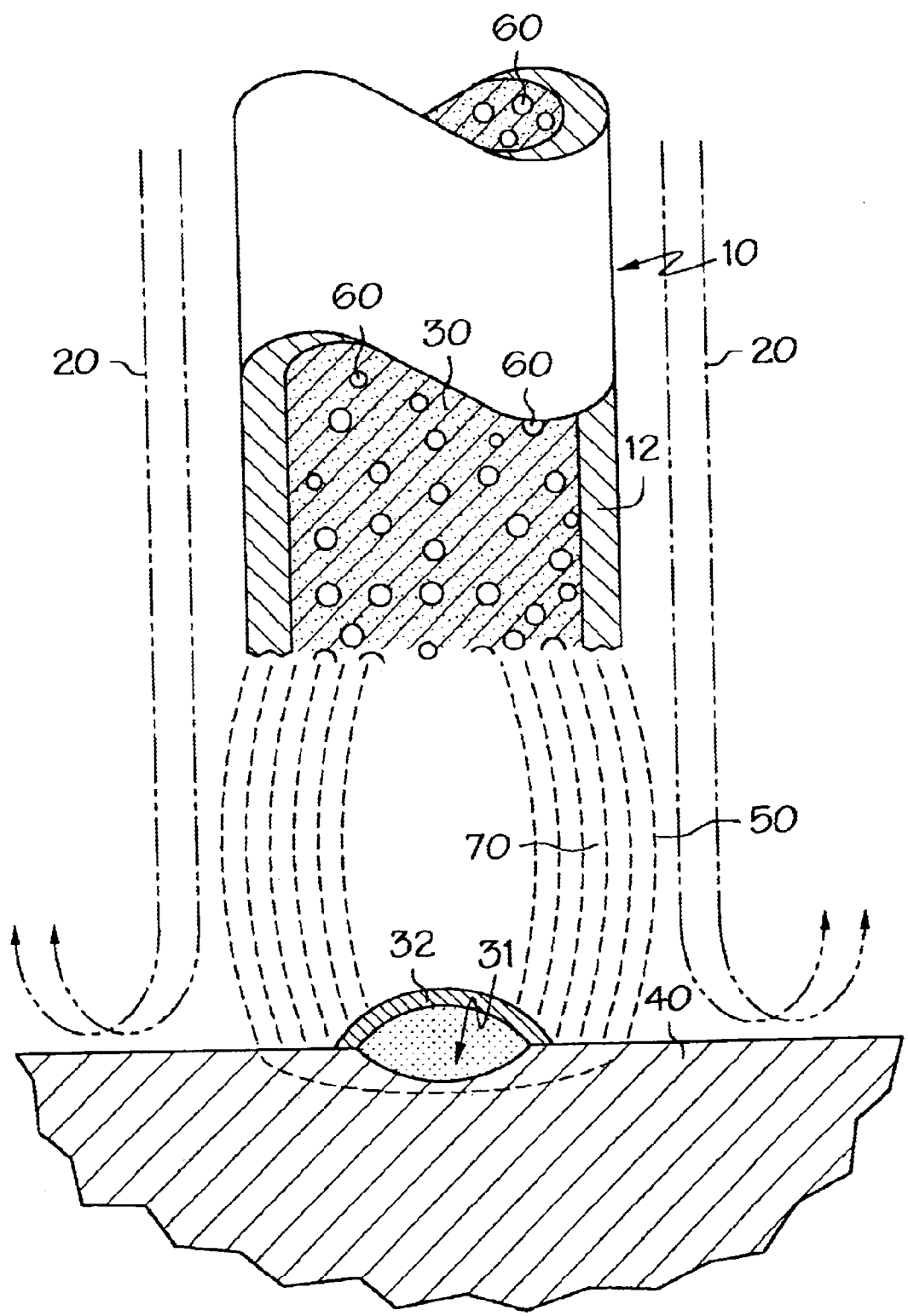
FIG. 1 is a schematic cross-sectional representation of an electrode in accordance with the present invention.

The flux cored wire of the present invention includes a steel sheath and a core composition disposed in the core of the steel sheath. The core composition is generally between approximately 1 to 45% of the total weight of the wire. FIG. 1 shows an electrode 10 in accordance with the invention having an outer steel sheath 12. Electrode 10 is used with a shielding gas 20 which is preferably argon but which may be a mixture of argon and carbon dioxide or carbon dioxide alone. Within the core 30 of the electrode 10 is a fill of particulate material including alloying agents, fluxing agents, and other constituents useful to form the desired weld bead or molten metal pool 31 and slag 32 when an arc 50 is created between the end of the electrode 10 and the metal work surface 40. In accordance with the invention, in a preferred embodiment, in addition to conventional additives core 30 includes composite manganese-containing particles 60 dispersed throughout the core. The amount of composite manganese-containing particles is selected to provide a weld having the desired performance characteristics.

The composite particle can take a number of different forms. Typically, the particle will be a composite admixture of manganese and the shielding material. Depending upon the ratio of shielding material to manganese and the process used to form the composite, the amount of manganese particles exposed at the surface of the composite particle will vary. In one embodiment, the composite particle can also be a capsule in which the manganese particle is entirely coated with a layer of the shielding material.

Figure 2:
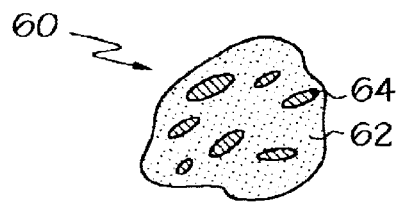
FIGS. 2 and 3 are cross-sectional schematic representations of composite particle morphologies useful in the invention.
Figure 3:
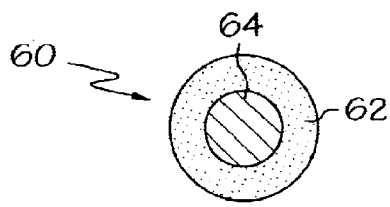

FIG. 2 illustrates a typical admixed particle 60 in which particles of manganese 64 are embedded in a matrix of the shielding material 62. These particles can vary in structure. The particles 60 shown in FIG. 2 include manganese particles 64 that extend from the surface to the structure. In FIG. 3, the particle 60 has an encapsulated structure in which a manganese particle 64 is coated with the shielding material 62. A composite particle structure is also possible in which multiple capsules agglomerate to produce the polycapsular particles. Those skilled in the art will recognize that the structure of the composite particle can be adjusted by varying the amount and particle size of the manganese and shielding material as well as varying the process used to create the admixture.

The composite particle 60 used in the present invention contains about 15 to 40% by weight manganese and about 60 to 85% of a shielding material. More typically, the particle contains about 20 to 30% by weight manganese and about 70 to 80% of the shielding material. A most preferred range is about 24 to 26% manganese. The composite particle ranges in particle size from about −30 to 150 mesh (i.e., less than 30 mesh but greater than 150 mesh) and more typically is about −50 to 100 mesh.

Figure 4:
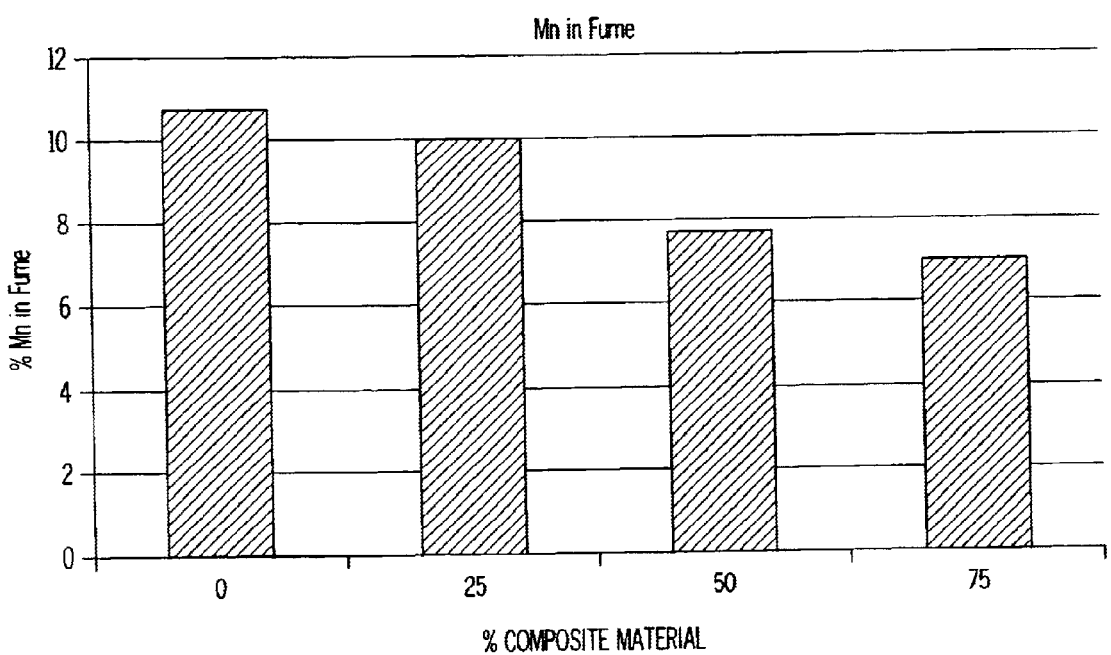
FIG. 4 is a graph obtained from a study of the amount of manganese in the fume as a function of the amount of composite particles in the wires.

The composite particle is present in the fill in an amount which yields an electrode and a weld deposit having the manganese content described in the tables below. The amount of the composite particle in the fill varies with the amount of manganese in the individual particles themselves and is adjusted to provide the desired Mn level in the weld deposit. Usually, the composite particle is present in the fill in an amount of about 10 to 60% based on the total weight of the fill. FIG. 4 shows the results of a study in which welding wires were prepared that contained 25, 50 and 75% composite particles in the core composition. The core composition made up 15% of the wire by weight. The amount of manganese in the wire remained the same, 2.32%. A shielding gas containing 75% Ar/25% $CO_2$ was used. FIG. 4 shows that the amount of Mn in the fume decreased from 11.6% to 7.37% as the amount of the composite particle increased. That is a reduction of 36% of the manganese in the fume.

In the preferred embodiment the shielding material is $TiO_2$. $TiO_2$ is available in the form of rutile and anatase. Rutile is currently preferred but anatose can also be used. The function of the shielding material is to shield the manganese from heating and oxygen during the time that the electrode is melted and the melted electrode solidifies with the weld pool. Based on the discovery that composite particles are effective in preventing vaporization and oxidation and reducing the amount of manganese in the fume, it will be recognized that composite particles formed from other shielding materials should also be effective for this purpose.

While rutile has been found to be an effective shielding material, other materials which can coat the manganese particles and shield them from oxidation during welding can be used. Rutile is a desirable shielding material because it possesses a relatively high melting point compared to manganese and it is capable of insulating the manganese. It is also desirable because it contributes to the stability of the arc and acts as a slag former. Thus, other materials having similar properties to those of rutile in terms of melting point, not destabilizing the arc and forming slag can also be used in accordance with the invention.

In accordance with one embodiment of the invention, the composite particle is formed by dry blending manganese particles ranging in average particle size from about −60 to 400 mesh with titanium dioxide particles ranging in particle size from about −60 to 325 mesh. The manganese and titanium dioxide are mixed in order to provide the desired shielding effect. In one embodiment, they can be mixed in a ratio of manganese to titanium dioxide of about 1:1 to 1:3. In one embodiment the shielding material has a smaller particle size than the manganese.

Typically, to prepare the composite particles, the blend of manganese and titanium dioxide is dry blended for approximately 10 minutes in a mixing blender. After dry blending, sodium silicate (water glass) in liquid form is added to the dry blend to bind the materials together into composite particles. In one example, the water glass is added in an amount of about 10–15% of the total weight of the manganese and titanium dioxide. This wet mixture produces composite particles of approximately ¼ inch diameter and less. To dry the particles, they can be distributed in stainless steel trays to form a bed approximately 1 inch deep. The particles are baked to remove the water. It is important that baking be conducted at a temperature which is high enough to drive the water from the particles but low enough that it does not oxidize the manganese. Heating one hour at 1260° F. has been found sufficient to dry particles in a stainless steel tray as described above. After the particles are allowed to cool to 100° F. or cooler, they can be ground to a screen size of 50 mesh or less. In one embodiment, 100% of the particles pass through a 50 mesh screen, and not more than 10% are held back on a 100 mesh screen. To remove the water from the composite particle alternate processes may be applied such as metering the wet mixture at a controlled rate into an inclined, rotating calciner.

While waterglass is the preferred binder, other materials that can be used for this purpose include materials that are capable of binding the manganese and shielding material into a composite particle together. Examples of other materials that can be considered for this purpose include other liquid silicates and high molecular weight materials such as molasses.

In addition to containing the composite manganese-containing particles, the fill material may include conventional alloying agents, oxide fluxing ingredients, arc stability and slag former ingredients. Representative examples of fill additions include $SiO_2$, $TiO_2$, $Al_2O_3$, $ZrO/SiO_2$ alloy and Mg/Al alloy.

Initial tests show reductions of manganese in fume can be achieved using argon shielding gas. Reductions of 71% have been achieved with argon. When using $CO_2$ and argon mixtures as the shielding gas, reductions in manganese initially have not been as great. In accordance with one embodiment of the invention the steel sheath or fill additionally contains magnesium. It has been found that with the addition of magnesium to the wire, manganese reductions of up to 36% are attainable with an argon-$CO_2$ shielding gas mixture. In one embodiment, the magnesium is present in the wire and/or fill in a total amount of up to about 3%.

Flux Cored wires in accordance with two embodiments of the invention have the wire composition, between the approximate ranges, by total weight of the wire indicated in Table 1. These electrodes are formulated to weld on mild steel or low alloy base materials and to meet AWS specifications for the weld deposit.

TABLE 1

| Flux Core Wire Composition | | |
|---|---|---|
| Constituent | Mild Steel[1] | Low Alloy[2] |
| C | 0.0–0.12 | 0.0–0.13 |
| Mn | 0.5–3.0 | 0.5–3.75 |
| Si | 0.0–2.0 | 0.0–2.0 |
| Ti | 0.05–0.7 | 0.05–0.7 |
| B | 0.0–0.1 | 0.0–0.1 |
| Cr | 0.0–0.4 | 0.0–10.5 |
| Ni | 0.0–0.5 | 0.0–3.75 |
| Mo | 0.0–0.1 | 0.0–1.2 |
| V | 0.0–0.5 | 0.0–0.25 |
| Al | 0.0–0.5 | 0.0–0.5 |
| Cu | 0.0–0.1 | 0.0–0.75 |
| Mg | 0.0–0.5 | 0.0–0.5 |
| Fe | 01.48–99.45 | 75.87–99.45 |

In the tables herein elemental percentages are reported to within one-hundredth of a percent, however, those skilled in the art will recognize that these percentages reflect industry standards and are not a technical limit on the invention. In the most typical embodiments of the invention, the wire (and weld bead) contains a minimum of 0.5% Mn. In one embodiment the Mn is present in an amount of about 0.5 to about 4.0%. While it is desirable to minimize carbon to minimize fume generation, typically the wire (and weld bead) will contain a minimum of 0.003% carbon. Industry standards for mild and low alloy steel limit the combined amount of Cr, Ni, Mo, V, Ti, B, and Mg to less than 0.5%. Higher amounts can be used without departing from the invention but industry standards would not be satisfied.

Core and sheath compositions by total weight of the wire for flux core wires in two embodiments of the invention are provided in Table 2 and Table 3:

TABLE 2

Core Composition for Flux Cored Wires

| Constituent | Mild Steel | Low Alloy |
|---|---|---|
| C | 0.0–0.12 | 0.0–0.13 |
| Mn | 0.5–3.0 | 0.5–3.75 |
| Si | 0.0–2.0 | 0.0–2.0 |
| Ti | 0.05–0.7 | 0.05–0.7 |
| B | 0.0–0.1 | 0.0–0.1 |
| Cr | 0.0–0.4 | 0.0–10.5 |
| Ni | 0.0–0.5 | 0.0–3.75 |
| Mo | 0.0–0.1 | 0.0–1.2 |
| V | 0.0–0.5 | 0.0–0.25 |
| Al | 0.0–0.5 | 0.0–0.5 |
| Cu | 0.0–0.1 | 0.0–0.75 | compositions follow AWS specifications and conventions and are illustrative only.

TABLE 3

Sheath Compositions:

| | Mild Steel | Low Alloy |
|---|---|---|
| C | 0.0–0.12 | 0.0–0.13 |
| Mn | 0.0–3.5 | 0.0–3.5 |
| Si | 0.0–2.0 | 0.0–2.0 |
| Fe | 55.25–99.25 | 55.0–99.0 |

In accordance with this invention any of the following (but not limited to) commercially available carbon steel and low alloy steel metal core wires can be modified as described herein to incorporate all or a portion of the manganese in a composite particle. The following tables represent these products and their typical deposit chemistry.

TABLE 4

| AWS Class. | C | Mn | Si | P | S | Mo | Cr | Ni | V | Cu |
|---|---|---|---|---|---|---|---|---|---|---|
| E80T1-A1 | .07 | .68 | .45 | .010 | .017 | .46 | | | | |
| E81T1-A1 | .04 | .83 | .26 | .014 | .016 | .48 | | | | |
| E80T1-B2 | .06 | .70 | .29 | .011 | .015 | .43 | 1.33 | | | |
| E81T1-B2 | .05 | .91 | .42 | .009 | .012 | .50 | 1.50 | | | |
| E90T1-B3 | .06 | .64 | .25 | .010 | .013 | 1.06 | 2.47 | — | — | — |
| E91T1-B3 | .05 | .64 | .27 | .011 | .013 | .93 | 2.04 | — | — | — |
| E90T1-Ni1 | .10 | .89 | .38 | .011 | .008 | — | — | .98 | — | — |
| E81T1-Ni1 | .06 | 1.20 | .57 | .009 | .015 | — | — | .94 | — | — |
| E80T1-Ni2 | .05 | .90 | .30 | .012 | .019 | — | — | 2.33 | — | — |
| E81T1-Ni2 | .05 | .94 | .37 | .011 | .018 | — | — | 2.42 | — | — |
| E91T1Ni2 | .08 | 1.18 | .60 | .012 | .021 | — | — | 2.41 | — | — |
| E100T5-D2 | .11 | 2.00 | .55 | .009 | .010 | .44 | — | — | — | — |
| E90T1-D3 | .06 | 1.12 | .60 | .010 | .011 | .41 | — | — | — | — |
| E80T1-K2 | .08 | 1.11 | .26 | .009 | .019 | .01 | — | 1.46 | — | — |
| E90T1-K2 | .05 | 1.00 | .34 | .008 | .015 | .13 | .03 | 1.41 | — | — |
| E91T1-K2 | .05 | 1.04 | .19 | .009 | .014 | .01 | — | 1.92 | — | — |
| E90T5-K2 | .05 | .83 | .33 | .009 | .016 | .22 | — | 1.65 | — | — |
| E100T1-K3 | .05 | 1.16 | .46 | .011 | .018 | .39 | — | 1.88 | .01 | — |
| E100T5-K3 | .08 | 1.34 | .48 | .013 | .017 | .39 | — | 1.89 | — | — |
| E110T1-K3 | .05 | 1.15 | .50 | .010 | .012 | .52 | — | 2.25 | .02 | — |
| E110T1-K3 | .07 | 1.55 | .34 | .009 | .0117 | .37 | .03 | 1.97 | .02 | — |
| E110T1-K3 | .05 | 1.46 | .32 | .008 | .014 | .36 | .03 | 2.08 | .02 | — |
| E110T5-K3 | .05 | 1.49 | .33 | .011 | .017 | .37 | — | 2.24 | — | — |
| E120T5-K4 | .07 | 1.88 | .42 | .010 | .016 | .61 | .52 | 2.13 | .01 | — |
| E80T1-W | .05 | 1.05 | .42 | .009 | .014 | — | .52 | .67 | — | .43 |
| E80T1-W | .06 | 1.30 | .70 | .008 | .014 | — | .59 | .75 | — | .38 |
| E71T1 | .021 | 1.30 | 0.69 | .015 | .011 | | | | | |
| E110T5-K | .04 | 1.5 | .41 | .01 | .014 | .42 | | 2.37 | | .42 |
| E71T-12J | .04 | 0.67 | .16 | .008 | .013 | | | .44 | | |
| E71J-1M | .04 | 1.24 | .29 | .010 | .015 | | | .37 | | |
| E81T-Ni1 | .068 | 1.35 | .40 | .014 | .011 | | | 1.06 | | |
| E70T-4 | .27 | .73 | .30 | .011 | .005 | Al = 1.42 | | | | |

TABLE 2-continued

Core Composition for Flux Cored Wires

| Constituent | Mild Steel | Low Alloy |
|---|---|---|
| Mg | 0.0–0.5 | 0.0–0.5 |
| Fe | 0.0–45.0 | 0.0–45.0 |

A comparison of Table 1 and Table 2 shows that up to about 45% of the iron and all of the other additions may be present in the core composition. Usually, the sheath will contain some of the carbon, manganese and silicon that make up the wire composition as shown in Table 3. These The invention is illustrated in more detail by the following examples.

EXAMPLE 1

Composite particles were prepared by dry blending 4.7 parts by weight manganese particles (avg. particle size about 80 mesh), 33.4 parts Mn/Fe/Si alloy particles having a particle size of about 80 mesh, and 56.7 parts rutile $TiO_2$ particles (avg. particle size about 80 mesh) for 10 minutes in a mixer blender. After blending, 5 parts sodium silicate (containing 3 parts water and 2 parts silicate) was added and blending continued until particles about 0.25 inch or less were obtained. These particles were dried 60 minutes in an oven at 1260° F. The composite particles were mixed with conventional fill materials for flux cored wires to provide the fill composition shown in Table 5 in parts by weight. The fill composition was deposited on a strip of metal and formed into a tube which enclosed the particles by drawing it through a series of forming dies in a manner well known in the art. The wire contained 15% fill.

The core, sheath and wire compositions of the wire are shown in Table 6 where all percentages are based on the total weight of the wire.

Wire 5: A wire analogous to Wire 4 but containing less MgO rutile.
Wire 6: A wire analogous to Wire 2 having less Mn available in the core.
Wire 7: A wire analogous to Wire 6 having less Mg available in the core.

TABLE 5

|  | Mg | Al | $ZRO_2$ | $Si/O_2$ | $Al_2O_3$ | $TiO_2$ | $Fe_2O_3$ | Ti | Fe | $NA_2O$ | $B_2O_3$ | $K_2O$ | Mn | Si | CaO | MgO |
|---|---|---|---|---|---|---|---|---|---|---|---|---|---|---|---|---|
| Fill 49.3% Core | 2.3 | 2.3 | 2.56 | 4.65 | 0.59 | 29.9 | .02 | 2.47 | 0.03 | 3.56 | 0.32 | 0.67 |  |  |  |  |
| Comp. Particle 50.7% Core |  |  |  | 1.76 |  | 15.9 | 1.29 |  | 1.35 | 0.24 |  |  | 13.05 | 4.91 | 9.85 | 0.72 |

TABLE 6

|  | Mg | Al | $ZRO_2$ | $Si/O_2$ | $Al_2O_3$ | $TiO_2$ | $Fe_2O_3$ | Ti | Fe | $NA_2O$ | $B_2O_3$ | $K_2O$ | Mn | Si | CaO | MgO |
|---|---|---|---|---|---|---|---|---|---|---|---|---|---|---|---|---|
| Core 15% Wire | .35 | 0.35 | 0.38 | 0.96 | 0.09 | 6.86 | 0.20 | 0.37 | 0.21 | 0.57 | 0.05 | 0.10 | 1.96 | 0.74 | 1.48 | 0.11 |
| Sheath 85% Wire |  |  |  |  |  |  |  |  | 84.72 |  |  |  | .26 |  |  |  |
| Total Wire | 0.35 | 0.35 | 0.38 | 0.96 | 0.09 | 6.86 | 0.90 | 0.37 | 84.93 | 0.57 | 0.05 | 0.10 | 2.32 | 0.74 | 1.48 | 0.11 |

EXAMPLE 2

A study of the effect of composite particles on manganese levels in the weld and the fume was conducted using the following wires:

Wire 1: A commercially available fluxed cord wire having a composition that meets AWS E71T-1 Class.
Wire 2: A wire having the same composition as Wire 1 except the manganese is incorporated in composite particles prepared using a CaO plus rutile mix.
Wire 3: A wire analogous to Wire 2 containing composite rutile-manganese particles with less manganese available in the core.
Wire 4: A wire analogous to Wire 3 except a MgO containing rutile was used in place of the CaO rutile of Wire 3.

Wires 2–7 were prepared using composite particles having the following compositions:

| Wire | $SiO2$ | $TiO2$ | $Fe2O3$ | Fe | $Na2O$ | Mn | Si | CaO | MgO |
|---|---|---|---|---|---|---|---|---|---|
| 2 | 1.61 | 14.50 | 1.18 | 1.56 | 0.22 | 14.76 | 5.70 | 9.02 | 0.65 |
| 3 | 1.57 | 14.09 | 1.15 | 1.72 | 0.21 | 14.29 | 6.59 | 9.54 | 0.64 |
| 4 | 0.66 | 15.41 |  | 1.82 | 0.20 | 14.34 | 6.60 |  | 10.19 |
| 5 | 0.66 | 22.51 |  | 1.82 | 0.20 | 14.34 | 6.60 |  | 3.09 |
| 6 | 1.76 | 15.90 | 1.29 | 1.35 | 0.24 | 13.05 | 4.91 | 9.85 | 0.7 |
| 7 | 1.76 | 15.90 | 1.29 | 1.35 | 0.24 | 13.05 | 4.91 | 9.85 | 0.7 |

Welds were prepared using these wires and the shielding gas compositions shown in table 7. The gas compositions are identified using the argon to carbon dioxide ratios.

Table 7 reports Mn available in each wire (1), Mg available in each wire (2), Mn in the weld (3), Mn in the slag (4), Mn in the fume (5), and the Mn reduction in the fume(6). The results show that by using the composite particle, the level of manganese in the fume can be reduced. The results also show that the manganese is more efficiently introduced into the weld.

TABLE 7

Mn Fume Study

|  | (1) Mn AVAIL. | (2) Mg AVAIL. | (3) Mn WELD | (4) Mn SLAG | (5) Mn FUME | (6) Mn RED.% |
|---|---|---|---|---|---|---|
| Shielding Gas: 100% Ar |  |  |  |  |  |  |
| Wire #1 | 2.59 | .15 | 1.79 | 7.18 | 6.2 | STD |
| Wire #2 | 2.59 | .15 | 2.04 | 5.59 | 1.77 | 71 |
| Wire #3 | 2.52 | .15 | 1.60 | 4.98 | 2.05 | 67 |
| Wire #4 | 2.51 | .15 | 1.45 | 6.92 | 2.55 | 59 |
| Wire #5 | 2.51 | .15 | 1.55 | 8.08 | 2.17 | 65 |
| Shielding Gas 98/2 $Ar/CO_2$ |  |  |  |  |  |  |
| Wire #1 | 2.59 | .15 | 1.47 | 7.68 | 5.15 | STD |
| Wire #2 | 2.59 | .15 | 1.77 | 5.10 | 4.15 | 19 |
| Shielding Gas 85/15 $Ar/CO_2$ |  |  |  |  |  |  |
| Wire #1 | 2.59 | .15 | 1.55 | 7.38 | 5.09 | STD |
| Wire #6 | 2.32 | .15 | 1.63 | 4.89 | 4.67 |  |
| Wire #7 | 2.32 | .30 | 1.66 | 3.89 | 4.30 | 29 |

TABLE 7-continued

Mn Fume Study

|  | (1) Mn AVAIL. | (2) Mg AVAIL. | (3) Mn WELD | (4) Mn SLAG | (5) Mn FUME | (6) Mn RED.% |
|---|---|---|---|---|---|---|
| Shielding Gas 75/25 Ar/CO$_2$ | | | | | | |
| Wire #1 | 2.59 | .15 | 1.67 | 8.45 | 6.15 | STD |
| Wire #2 | 2.59 | .15 | 1.83 | 5.45 | 4.61 | |
| Wire #6 | 2.32 | .15 | 1.68 | | 4.35 | |
| Wire #7 | 2.32 | .30 | 1.68 | | 3.59 | 41 |
| Shielding Gas CO$_2$ | | | | | | |
| Wire #1 | 2.59 | .15 | 1.43 | 8.99 | 5.95 | STD |
| Wire #2 | 2.59 | .15 | 1.60 | 6.06 | 5.17 | |
| Wire #6 | 2.32 | .15 | 1.39 | 6.07 | 4.71 | |
| Wire #7 | 2.32 | .30 | 1.34 | 4.75 | 4.44 | 25 |

EXAMPLE 3

A standard wire (Wire #1) was modified such that 25, 50, 75, and 100% of the available manganese was introduced into the core of the wire in the form of composite particles with rutile. The wires were used in a welding test using a 75% argon and 25% carbon dioxide mixture. The amount of manganese in the fume was measured. The results are shown in Table 8. The results show that by incorporating the manganese in a composite particle, the amount of manganese in the fume is reduced.

TABLE 8

| Wire #1 | Mn in Fume |
|---|---|
| 0% | 11.6 |
| 25% | 10.05 |
| 50% | 7.87 |
| 75% | 7.37 |
| 100% | 8.1 |

Having described the invention in detail and by reference to specific embodiments thereof, it will be apparent the numerous modifications and variations are possible without departing from the spirit and scope of the invention.

What is claimed is:

1. A cored electrode for arc welding, said electrode having a core in which the fill material includes a manganese-containing composite particle wherein the composite particle contains manganese in admixture with a shielding material.

2. The electrode of claim 1 wherein the shielding material is TiO$_2$.

3. The eletrode of claim 2 wherein the shielding materials is rutile.

4. The electrode of claim 3 wherein the shielding material is anastace.

5. The electrode of claim 1 wherein the wire contains at least about 0.5% by weight manganese.

6. The electrode of claim 1 wherein the composite particle contains manganese encapsulated in a coating of said shielding material.

7. The electrode of claim 1 wherein the composite particle is made up of manganese particles dispersed in a matrix of the shielding material.

8. The electrode of claim 1 wherein the composite particle itself contains about 15 to 40% manganese based on total particle weight.

9. The electrode of claim 1 wherein the electrode is formulated for welding on mild steel and has the following composition in approximate percent by weight of the wire:

| Constituent | Mild Steel |
|---|---|
| C | 0.0–0.12 |
| Mn | 0.5–3.0 |
| Si | 0.0–2.0 |
| Ti | 0.05–0.7 |
| B | 0.0–0.1 |
| Cr | 0.0–0.4 |
| Ni | 0.0–0.5 |
| Mo | 0.0–0.1 |
| V | 0.0–0.5 |
| Al | 0.0–0.5 |
| Cu | 0.0–0.1 |
| Mg | 0.0–0.5 |
| Fe | 01.48–99.45 |

10. The electrode of claim 1 wherein the electrode is formulated for welding on low alloy steel and has the composition in approximate percent by weight of the wire:

| Constituent | Low Alloy |
|---|---|
| C | 0.0–0.13 |
| Mn | 0.5–3.75 |
| Si | 0.0–2.0 |
| Ti | 0.05–0.7 |
| B | 0.0–0.1 |
| Cr | 0.0–10.5 |
| Ni | 0.0–3.75 |
| Mo | 0.0–1.2 |
| V | 0.0–0.25 |
| Al | 0.0–0.5 |
| Cu | 0.0–0.75 |
| Mg | 0.0–0.5 |
| Fe | 75.87–99.45 |

* * * * *

UNITED STATES PATENT AND TRADEMARK OFFICE
CERTIFICATE OF CORRECTION

PATENT NO. : 6,784,401 B2
DATED : August 31, 2004
INVENTOR(S) : Lowell W. Mott et al.

It is certified that error appears in the above-identified patent and that said Letters Patent is hereby corrected as shown below:

Title page,
Item [75], Inventors, change "Lowell E. Mott" to -- Lowell W. Mott --.

Signed and Sealed this

Eighteenth Day of January, 2005

JON W. DUDAS
*Director of the United States Patent and Trademark Office*